(12) United States Patent
Ichimura (10) Patent No.: US 10,139,606 B2
(45) Date of Patent: Nov. 27, 2018

(54) ZOOM LENS FOR FORMING HIGH-DEFINITION IMAGE AND IMAGE PROJECTION APPARATUS HAVING THE SAME

(71) Applicant: CANON KABUSHIKI KAISHA, Tokyo (JP)

(72) Inventor: Junya Ichimura, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 215 days.

(21) Appl. No.: 14/939,287

(22) Filed: Nov. 12, 2015

(65) Prior Publication Data

US 2016/0139383 A1     May 19, 2016

(30) Foreign Application Priority Data

Nov. 19, 2014 (JP) ................................. 2014-234447

(51) Int. Cl.
*G02B 15/177* (2006.01)
*G02B 13/16* (2006.01)

(52) U.S. Cl.
CPC .......... *G02B 15/177* (2013.01); *G02B 13/16* (2013.01)

(58) Field of Classification Search
CPC ....... G02B 15/16; G02B 15/177; G02B 13/16
USPC .......... 359/649, 680, 682, 676, 683
See application file for complete search history.

(56) References Cited

U.S. PATENT DOCUMENTS

| 6,496,310 B2 * | 12/2002 | Fujimoto | G02B 15/177 |
| | | | 359/566 |
| 8,379,316 B2 * | 2/2013 | Nagahara | G02B 15/177 |
| | | | 359/680 |
| 2014/0192419 A1 | 7/2014 | Inoko | |

FOREIGN PATENT DOCUMENTS

| JP | 2011-028123 A | 2/2011 |
| JP | 5053694 B2 | 10/2012 |
| JP | 2013-200454 A | 10/2013 |
| JP | 2014-089300 A | 5/2014 |
| JP | 2014-134567 A | 7/2014 |

OTHER PUBLICATIONS

Machine Translation JP 2013-200454; published Oct. 3, 2013.*
Office Action issued in German application No. 102015119973.4 dated Jun. 13, 2017.

* cited by examiner

*Primary Examiner* — Zachary Wilkes
(74) *Attorney, Agent, or Firm* — Carter, DeLuca, Farrell & Schmidt LLP (57) ABSTRACT

A zoom lens includes, in order from an enlargement conjugate side to a reduction conjugate side, a first lens unit (B1) having a negative refractive power, a second lens unit (B2) having a positive refractive power, a third lens unit (B3) having a positive refractive power, a stop (sto), a fourth lens unit (B4) having a positive refractive power, a fifth lens unit (B5) having a negative refractive power, a sixth lens unit (B6) having a negative refractive power, and a seventh lens unit (B7) having a positive refractive power, and when zooming from a wide-angle end to a telephoto end, the second lens unit (B2), the third lens unit (B3), the fourth lens unit (B4), the fifth lens unit (B5), and the sixth lens unit (B6) move from the reduction conjugate side to the enlargement conjugate side while a space between adjacent lens units changes.

19 Claims, 7 Drawing Sheets

ZOOM LENS FOR FORMING HIGH-DEFINITION IMAGE AND IMAGE PROJECTION APPARATUS HAVING THE SAME

BACKGROUND OF THE INVENTION

Field of the Invention

The present invention relates to a zoom lens which is suitably used for an image projection apparatus that enlarges and projects an image.

Description of the Related Art

Recently, a zoom lens having a high resolution is required according to requirements of a high reality and high presence resulting from a super resolution of an image. Furthermore, for the zoom lens, an image plane with a higher flatness is required due to a decrease of a permissible width of depth by enhancing its resolution.

In an image projection apparatus, it is necessary to provide a space to guide illumination light to an image formation element, and accordingly a back focus of a zoom lens needs to be long to some extent. In the image projection apparatus, a pupil is determined by an illumination optical system. In order to ensure a satisfactory illuminance distribution, the zoom lens needs to be telecentric at a reduction conjugate side. It is preferred that various aberrations such as distortion and chromatic aberration of magnification are appropriately corrected so that distortion and color shift do not occur in a projected image with respect to an original image.

Japanese Patent No. 5053694 discloses a zoom lens which includes, in order from an enlargement conjugate side to a reduction conjugate side, lens units having negative, positive, positive, positive, negative, positive, and positive refractive powers.

However, in the configuration disclosed in Japanese Patent No. 5053694, changes of brightness, spherical aberration, astigmatism, and distortion during zooming cannot be effectively reduced, and accordingly it is difficult to achieve a higher resolution.

SUMMARY OF THE INVENTION

The present invention provides a zoom lens and an image projection apparatus which are capable of forming a high-definition image in which various aberrations are appropriately corrected over a range from a wide angle-end to a telephoto end.

A zoom lens as one aspect of the present invention includes, in order from an enlargement conjugate side to a reduction conjugate side, a first lens unit having a negative refractive power, a second lens unit having a positive refractive power, a third lens unit having a positive refractive power, a stop, a fourth lens unit having a positive refractive power, a fifth lens unit having a negative refractive power, a sixth lens unit having a negative refractive power, and a seventh lens unit having a positive refractive power, and when zooming from a wide-angle end to a telephoto end, the second lens unit, the third lens unit, the fourth lens unit, the fifth lens unit, and the sixth lens unit are configured to move from the reduction conjugate side to the enlargement conjugate side while a space between lens units adjacent to each other changes.

An image projection apparatus as another aspect of the present invention includes an image display element configured to form an original image and the zoom lens, and the zoom lens is configured to project the original image formed by the image display element.

Further features and aspects of the present invention will become apparent from the following description of exemplary embodiments with reference to the attached drawings.

DESCRIPTION OF THE EMBODIMENTS

Exemplary embodiments of the present invention will be described below with reference to the accompanied drawings.

Due to the improvement of the resolution of recent image projection apparatuses (projectors), an image is increasingly projected on a large screen to see the projected image in close-up. It is preferred that the zoom lens has a high angle of field according to this requirement. Therefore, this embodiment will describe the zoom lens having an angle of field larger than a conventional standard angle of field.

The zoom lens of this embodiment includes, in order from an enlargement conjugate side to a reduction conjugate side, a first lens unit B1, a second lens unit B2, a third lens unit B3, a stop sto, a fourth lens unit B4, a fifth lens unit B5, a sixth lens unit B6, and a seventh lens unit B7. The first lens unit B1 has a negative refractive power. The second lens unit B2 has a positive refractive power. The third lens unit B3 has a positive refractive power. The fourth lens unit B4 has a positive refractive power. The fifth lens unit B5 has a negative refractive power. The sixth lens unit B6 has a negative refractive power. The seventh lens unit B7 has a positive refractive power.

When a high angle of field and along back focus are required, it is preferred that the first lens unit B1 adopts a so-called retrofocus-type optical system (zoom lens) having a negative refractive power. By fixing the first lens unit B1 which is located at the enlargement conjugate side relative to a magnification-varying lens unit, the focusing can be performed without contributing to the zooming (varying the magnification) with a simple configuration. Furthermore, in order to design the zoom lens to be telecentric and prevent the change of the telecentricity during the zooming, a lens unit closest to the reduction conjugate side has a positive refractive power and it does not move (i.e., it is fixed) for the zooming.

Each of the second lens unit B2 and the third lens unit B3 has a positive refractive power, and they come close to the first lens unit B1 having a negative refractive power during the zooming, and accordingly they are capable of increasing a focal length as a whole (i.e., entire focal length) and taking in sufficient bright FNO light beam.

The fourth lens unit B4, the fifth lens unit B5, and the sixth lens unit B6 move from the reduction conjugate side to the enlargement conjugate side to correct an image point. When a resolution higher than that of a conventional configuration is required, it is necessary to correct a change of the spherical aberration over a range from the wide-angle end to the telephoto end or a change of an image plane for each color at the middle position since a permissible width of depth decreases. In this embodiment, the fourth lens unit B4 has a positive refractive power, the fifth lens unit B5 has a negative refractive power, and the sixth lens unit B6 has a negative refractive power. The fifth lens unit B5 moves between the fourth lens unit B4 and the sixth lens unit B6, and accordingly the correction described above can be appropriately performed.

As described above, in this embodiment, during the zooming from the wide-angle end to the telephoto end, the second lens unit B2, the third lens unit B3, the fourth lens unit B4, the fifth lens unit B5, and the sixth lens unit B6 move from the reduction conjugate side to the enlargement conjugate side while a space (distance) between lens units adjacent to each other changes. During the zooming, the stop moves with a locus different from loci of the third lens unit B3 and the fourth lens unit B4. It is preferred that the first lens unit B1 and the seventh lens unit B7 do not move (i.e., the first lens unit B1 and the seventh lens unit B7 are fixed) for zooming.

A focal length of the zoom lens at the wide-angle end is denoted by fw, and a focal length of the first lens unit B1 is denoted by f1. In this case, it is preferred that the zoom lens of this embodiment satisfies the following conditional expression (1).

$$1.8 < |f1|/fw < 5.0 \tag{1}$$

Conditional expression (1) is a condition for enhancing the resolution and also for reducing a deterioration of the performance during the zooming. When a value exceeds the lower limit of conditional expression (1), a remaining aberration amount in the first lens unit B1 tends to be large and further it increases due to the zooming, and accordingly it is difficult to ensure a satisfactory performance. On the other hand, when a value exceeds the upper limit of conditional expression (1), a divergence of the first lens unit B1 is too weak, and accordingly it is difficult to obtain a predetermined angle of field. It is more preferable that the zoom lens of this embodiment satisfies the following conditional expression (1a).

$$2.3 < |f1|/fw < 4.0 \tag{1a}$$

An air conversion back focus (air conversion length of a back focus) from a lens surface closest to the reduction conjugate side in the zoom lens to an image plane IP is denoted by bf. In this case, it is preferred that the zoom lens of this embodiment satisfies the following conditional expression (2).

$$0.1 < fw/bf < 1.0 \tag{2}$$

Conditional expression (2) is a condition for obtaining an appropriate back focus. When a value exceeds the lower limit of conditional expression (2), a lens diameter significantly increases and therefore it is not preferable. On the other hand, when a value exceeds the upper limit of conditional expression (2), it is difficult to take in sufficient illumination light. It is more preferable that the zoom lens of this embodiment satisfies the following conditional expression (2a).

$$0.2 < fw/bf < 0.5 \tag{2a}$$

In a typical zoom lens, an FNO light beam whose diameter increases in the zoom lens is cut during the zooming from the wide-angle end to the telephoto end. On the other hand, in an image projection apparatus (projector), the luminance of a projected image is decreased and also the inside of the zoom lens is subjected to high heat because of a large amount of light energy which is cut at the telephoto end, which results in various impacts. Such a heat impact needs to be further reduced as the resolution improves.

In this embodiment, the stop sto is disposed at a position between the third lens unit B3 and the fourth lens unit B4 where the FNO light beam is convergent light from the enlargement conjugate side toward the reduction conjugate side. When zooming from the wide-angle end to the telephoto end, the stop sto is configured to move so that a space between the stop sto and the third lens unit B3 increases (i.e., the space is widened), and accordingly the FNO light beam at the telephoto end is prevented from being cut. When zooming from the wide-angle end to the telephoto end, the stop sto is configured to move so that a space between the stop sto and the fourth lens unit B4 decreases (i.e., the space is narrowed), and accordingly the effect similar to that described above can be obtained. In this embodiment, it is preferred that the stop sto is set as a single moving unit. In this configuration, a movement of each lens unit and an aberration correction are not limited by a movement of the stop sto, and accordingly a good optical performance can be easily obtained.

It is preferred that the zoom lens of this embodiment satisfies the following conditional expression (3) where m4 is a moving amount of the fourth lens unit B4 and m5 is a moving amount of the fifth lens unit B5 during the zooming.

$$0.8 < m4/m5 < 1.5 \tag{3}$$

It is preferred that the zoom lens of this embodiment satisfies the following conditional expression (4) where m5 is a moving amount of the fifth lens unit B5 and m6 is a moving amount of the sixth lens unit B6 during the zooming.

$$0.8 < m5/m6 < 1.5 \tag{4}$$

Conditional expression (3) represents a ratio of the moving amount of the fourth lens unit B4 to the moving amount of the fifth lens unit B5. Conditional expression (4) represents a ratio of the moving amount of the fifth lens unit B5 to the moving amount of the sixth lens unit B6. When a value exceeds the upper limit or the lower limit of each of conditional expressions (3) and (4), it is difficult to obtain a correction effect at the middle position since the way of the ray significantly changes during the zooming. When a value exceeds the upper limit of conditional expression (3), an appropriate space cannot be provided between the stop sto and the fourth lens unit B4 or a brightness at the telephoto end is darkened, and therefore it is not preferable. In this embodiment, the middle position means a variable magnification position (zoom position) which is obtained by the one-half power of a product of focal lengths of the zoom lens at the wide-angle end and at the telephoto end.

It is more preferable that the zoom lens of this embodiment satisfies the following conditional expression (3a).

$$0.9<m4/m5<1.4 \tag{3a}$$

It is more preferable that the zoom lens of this embodiment satisfies the following conditional expression (4a).

$$0.9<m5/m6<1.2 \tag{4a}$$

A space between the fifth lens unit B5 and the sixth lens unit B6 at the wide-angle end is denoted by D56W, a space between the fifth lens unit B5 and the sixth lens unit B6 at the middle position is denoted by D56M, and a space between the fifth lens unit B5 and the sixth lens unit B6 at the telephoto end is denoted by D56T. In this case, it is preferred that the zoom lens of this embodiment satisfies the following conditional expression (5).

$$0.1<(D56W+D56T)/(2\times D56M)<1.0 \tag{5}$$

Conditional expression (5) represents that a space between the fifth lens unit B5 and the sixth lens unit B6 is maximized when the zoom lens is at the middle position. Accordingly, the correction at the middle position can be appropriately performed by changing a moving direction of the fifth lens unit B5 at the middle position. When a value exceeds the upper limit of conditional expression (5), the moving direction of the fifth lens unit B5 is opposite at the middle position and therefore the performance is rather deteriorated. On the other hand, when a value exceeds the lower limit of conditional expression (5), the moving amount of the fifth lens unit B5 is too large and accordingly it is rather difficult to reduce a chromatic aberration of magnification and a defocus for each color while correcting the image point appropriately.

It is more preferable that the zoom lens of this embodiment satisfies the following conditional expression (5a).

$$0.5<(D56W+D56T)/(2\times D56M)<1.0 \tag{5a}$$

In the zoom lens of this embodiment, it is preferred that each of the second lens unit B2 and the third lens unit B3 is constituted by a single lens having a positive refractive power. In both of the second lens unit B2 and the third lens unit B3 among the moving units, the FNO light beam is large, and therefore both of them tend to be thick by using a plurality of lenses for achromatization, which results in a decrease in a transmittance.

In the zoom lens of this embodiment, it is preferred that the first lens unit B1 includes at least a negative meniscus aspherical lens convex toward the enlargement conjugate side. By disposing a plurality of aspherical lenses in the first lens unit B1 in which a height of an off-axis principal ray can be sufficiently ensured, the flatness of the image plane at the wide-angle end improves and also the distortion can be appropriately corrected.

In the zoom lens of this embodiment, it is preferred that each of the fourth lens unit B4 and the fifth lens unit B5 is constituted by a single lens having a positive refractive power and a single lens having a negative refractive power. By the achromatization of the fourth lens unit B4 and the fifth lens unit B5, the aberration is corrected and also the change of the performance during the zooming can be reduced.

It is preferred that the sixth lens unit B6 includes, in order from the enlargement conjugate side to the reduction conjugate side, a lens having a negative refractive power, a lens having a positive refractive power, and a lens having a positive refractive power. Similarly to the fourth lens unit B4 and the fifth lens unit B5, by including a cemented lens for the achromatization, the aberration is corrected and also the change of the performance during the zooming can be reduced.

Hereinafter, with respect to the zoom lens of this embodiment, specific embodiments will be described.

Embodiment 1

Figure 1:
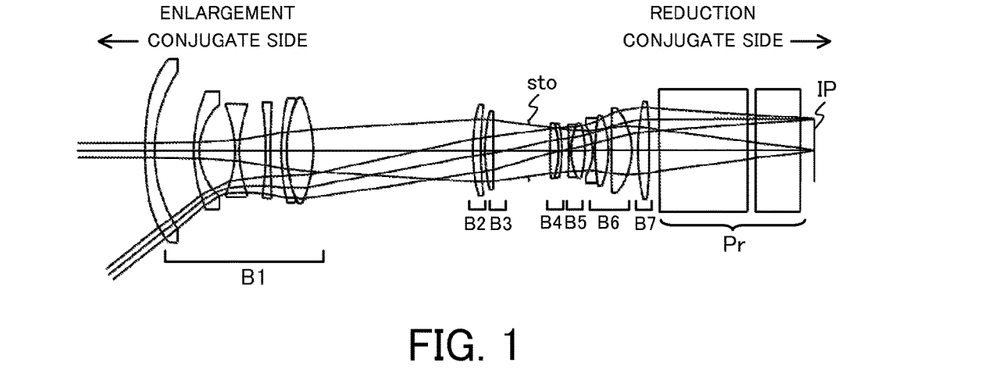
FIG. 1 is a cross-sectional view of an optical system at a wide-angle end in Embodiment 1.
Figure 2:
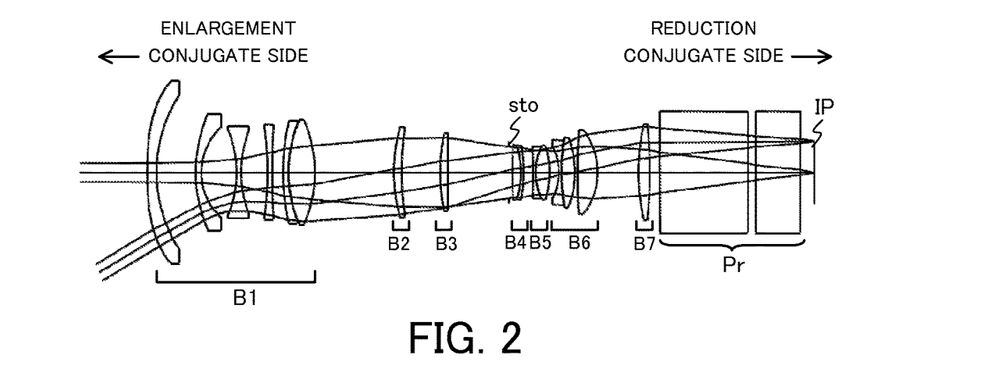
FIG. 2 is a cross-sectional view of the optical system at a telephoto end in Embodiment 1.

First, referring to FIGS. 1 to 5, a zoom lens (optical system) in Embodiment 1 of the present invention will be described. FIG. 1 is a cross-sectional view of the zoom lens at a wide-angle end in this embodiment. FIG. 2 is a cross-sectional view of the zoom lens at a telephoto end in this embodiment. The zoom lens of this embodiment is a projection optical system that is designed mainly for an image projection apparatus (projector), and it includes a prism glass PR disposed closest to the reduction conjugate side (i.e., disposed closest to the image plane IP).

Figure 3:
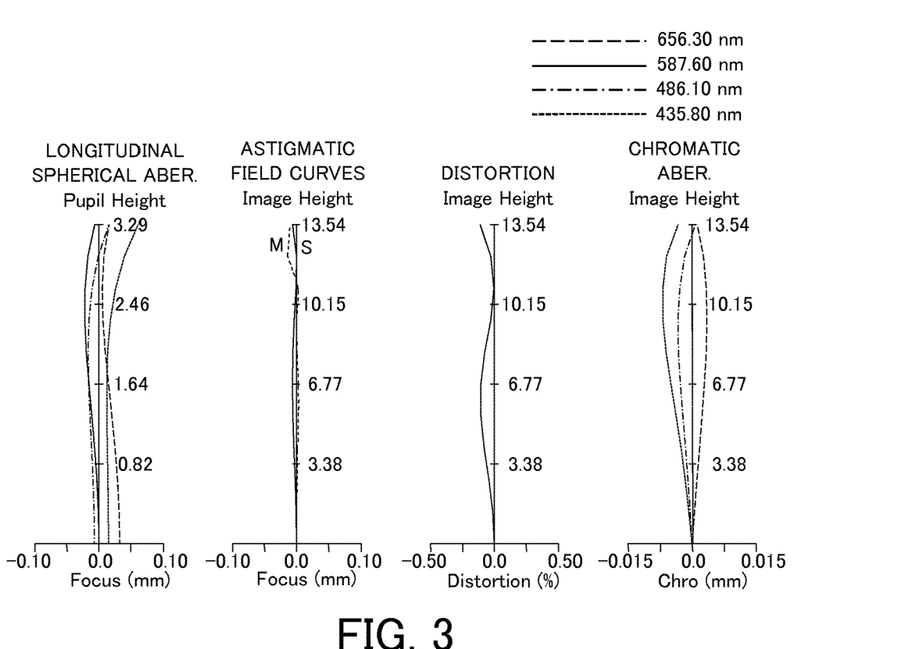
FIG. 3 is an aberration diagram of the optical system at the wide-angle end in Embodiment 1.
Figure 4:
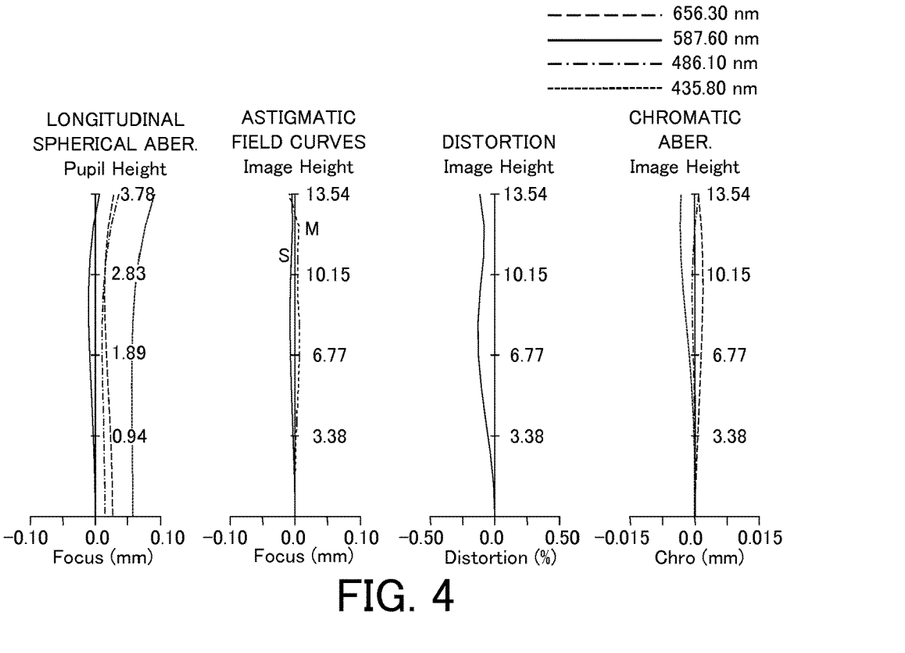
FIG. 4 is an aberration diagram of the optical system at a middle position in Embodiment 1.
Figure 5:
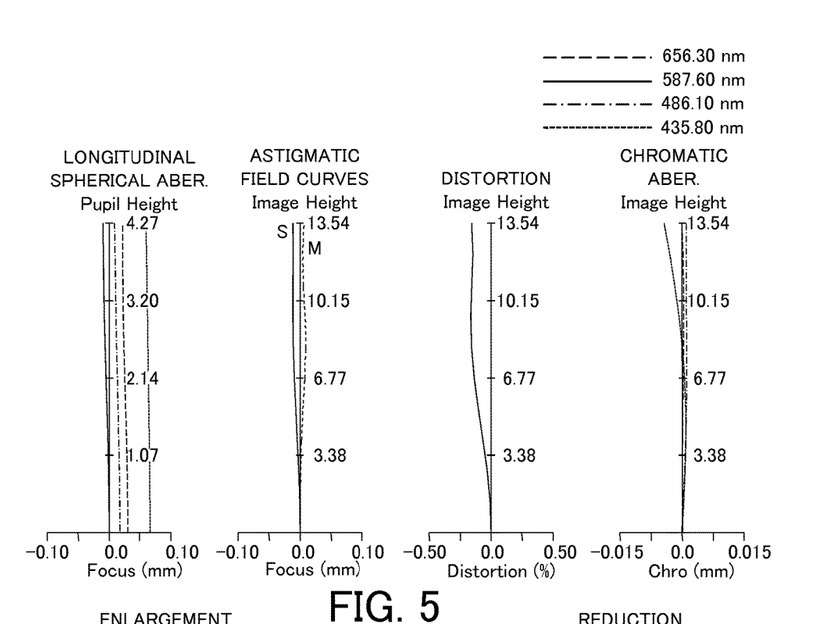
FIG. 5 is an aberration diagram of the optical system at the telephoto end in Embodiment 1.

FIG. 3 is an aberration diagram of the zoom lens at the wide-angle end, FIG. 4 is an aberration diagram of the zoom lens at the middle position, FIG. 5 is an aberration diagram of the zoom lens at the telephoto end, and each of which illustrates an imaging performance of the zoom lens (wide-angle lens) where an object distance is 1534 mm. In the zoom lens of this embodiment, a satisfactory focusing performance is ensured by the effect described above and also the deterioration of the performance is small during the zooming.

In each of FIGS. 3 to 5, in order from the left side, a spherical aberration, astigmatism, distortion, and chromatic aberration of magnification are illustrated. With respect to the spherical aberration, a dashed line indicates an aberration for a C-line (656.3 nm), a solid line indicates an aberration for a d-line (587.6 nm), a dashed-dotted line indicates an aberration for an F-line (486.1 nm), and a dotted line indicates an aberration for a g-line (435.8 nm). A scale of a horizontal axis indicates a defocus amount, which is within a range from −0.10 to +0.10 [mm]. With respect to the astigmatism, a solid line and a dotted line indicate field curvatures for a sagittal image surface and a meridional image surface, respectively. A horizontal axis is the same as that of the spherical aberration. With respect to the distortion, a scale of a horizontal axis is indicated within a range from −0.5 to +0.5 [%].

Numerical example 1 of this embodiment is as follows. In Numerical example 1, symbol f denotes a focal length, symbol ω denotes a half angle of field, symbol FNO denotes an F number, and symbol Φ denotes a refractive power. In Numerical example 1, a surface number is the number of each of lens surfaces counted from the enlargement conjugate side to the reduction conjugate side, symbol R denotes a radius of curvature of each lens surface, symbol d denotes a surface space, and symbols Nd and νd respectively denote a refractive index and Abbe number of the glass material for the d-line (587.56 nm). A lens surface where "s" is added to the right indicates a position of a stop sto. A lens surface where "*" (asterisk) is added to the right indicates an aspherical surface shape according to the following function whose coefficients are indicated in Numerical example 1. Symbol y denotes a coordinate in a radial direction with reference to a vertex of a lens surface, and symbol x denotes a coordinate in an optical axis direction with reference to the vertex of the lens surface.

$$x=(y^2/R)/[1+\{1-(1+K)(y^2/R^2)\}^{1/2}]+Ay^4+By^6+Cy^8+Dy^{10}+Ey^{12}+Fy^{14}+Gy^{16}$$

These descriptions are applied also to Numerical examples 2 and 3 described blow.

Numerical Example 1 f = 17.08-22.19 ω = 38.3~31.3 Fno = 2.6 Φ = 27.08

| no | Φea | R | d | glass | Nd | νd |
|---|---|---|---|---|---|---|
| OBJ | | | 1534.00 | | | |
| 1* | 76.00 | 174.392 | 4.20 | SBSL7 | 1.51633 | 64.14 |
| 2 | 67.95 | 62.856 | 17.00 | | | |
| 3* | 47.87 | 55.879 | 2.60 | SLAL8 | 1.71299 | 53.87 |
| 4 | 39.62 | 26.747 | 15.60 | | | |
| 5 | 37.57 | −46.171 | 2.00 | SFPL51 | 1.49700 | 81.54 |
| 6 | 36.41 | 52.340 | 11.41 | | | |
| 7 | 37.92 | −150.600 | 2.00 | SLAM2 | 1.74399 | 44.79 |
| 8 | 38.79 | 346.851 | 4.78 | | | |
| 9 | 42.04 | 99.287 | 2.30 | EFDS1W | 1.92285 | 20.88 |
| 10 | 42.32 | 56.193 | 11.50 | SNBH52 | 1.67300 | 38.15 |
| 11 | 43.03 | −56.193 | (VARIABLE) | | | |
| 12 | 36.87 | 71.947 | 3.30 | SBAL35 | 1.58913 | 61.13 |
| 13 | 36.27 | 141.375 | (VARIABLE) | | | |
| 14 | 31.32 | 80.940 | 3.55 | FD60W | 1.80518 | 25.46 |
| 15 | 30.73 | −5606.356 | (VARIABLE) | | | |
| 16 | 22.32 | (STO) | (VARIABLE) | | | |
| 17 | 21.91 | 368.763 | 3.70 | SBSL7 | 1.51633 | 64.14 |
| 18 | 21.54 | −38.620 | 1.30 | TAFD25 | 1.90365 | 31.31 |
| 19 | 21.52 | −63.551 | (VARIABLE) | | | |
| 20 | 20.50 | −155.343 | 1.20 | TAFD25 | 1.90365 | 31.31 |
| 21 | 20.77 | 28.776 | 5.90 | SBSL7 | 1.51633 | 64.14 |
| 22 | 21.69 | −41.875 | (VARIABLE) | | | |
| 23 | 22.44 | −24.146 | 1.30 | TAFD25 | 1.90365 | 31.31 |
| 24 | 25.61 | 96.004 | 5.75 | SBSL7 | 1.51633 | 64.14 |
| 25 | 27.96 | −41.868 | 1.30 | | | |
| 26 | 32.17 | 562.451 | 8.75 | SFPL51 | 1.49700 | 81.54 |
| 27 | 34.11 | −29.109 | (VARIABLE) | | | |
| 28 | 39.46 | 93.214 | 5.00 | SNPH1 | 1.80809 | 22.76 |
| 29 | 39.38 | −196.899 | 4.39 | | | |
| 30 | 50.00 | ∞ | 38.70 | SBSL7 | 1.51633 | 64.14 |
| 31 | 50.00 | ∞ | 3.43 | | | |
| 32 | 50.00 | ∞ | 19.50 | SF6 | 1.80518 | 25.43 |
| 33 | 50.00 | ∞ | 5.87 | | | |
| IMG | | | | | | |

ASPHERICAL COEFFICIENT

| | sur | |
|---|---|---|
| | 1* | 3* |
| R | 5.73420E−03 | 1.78960E−02 |
| k | 0.00000E+00 | 0.00000E+00 |
| A | 2.74724E−06 | −2.13015E−06 |
| B | −8.76646E−10 | −5.75098E−11 |
| C | 6.15033E−13 | 1.45842E−12 |
| D | −2.65404E−16 | −1.12791E−15 |
| E | 7.68366E−20 | −2.56671E−19 |
| F | 0.00000E+00 | 0.00000E+00 |
| G | 0.00000E+00 | 0.00000E+00 |

ZOOMING SPACE

| sur | Wide-angle end | Middle position | Telephoto end |
|---|---|---|---|
| 11 | 69.8129 | 52.6452 | 34.7323 |
| 13 | 2.1186 | 7.5658 | 16.8667 |
| 15 | 15.1539 | 21.5541 | 26.5998 |

-continued f = 17.08-22.19 ω = 38.3~31.3 Fno = 2.6 Φ = 27.08

| 16 | 9.5344 | 6.4430 | 1.5155 |
|---|---|---|---|
| 19 | 2.9525 | 2.0000 | 4.0786 |
| 22 | 3.3055 | 4.4459 | 4.0785 |
| 27 | 2.6816 | 10.9053 | 17.6880 |

Embodiment 2

Next, referring to FIGS. 6 to 10, a zoom lens (optical system) in Embodiment 2 of the present invention will be described. This embodiment relates to the zoom lens in which an angle of field at a wide-angle end is set to be higher, and accordingly the effect described above can be obtained even when the angle of field is changed. In the zoom lens having a higher angle of field, an increase of a lens diameter can be suppressed by setting a back focus to be slightly short.

Figure 6:
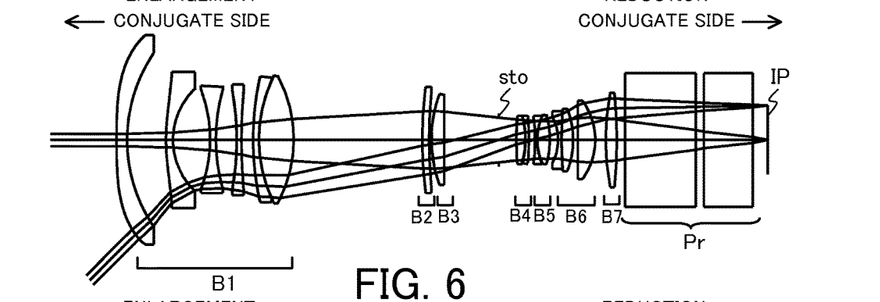
FIG. 6 is a cross-sectional view of an optical system at a wide-angle end in Embodiment 2.
Figure 7:
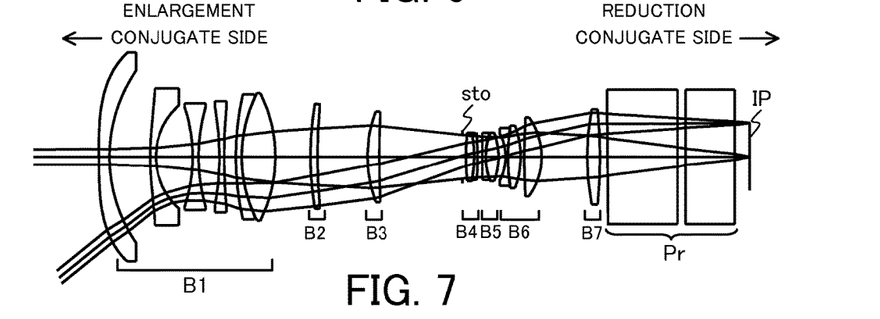
FIG. 7 is a cross-sectional view of the optical system at a telephoto end in Embodiment 2.

FIG. 6 is a cross-sectional view of the zoom lens at a wide-angle end in this embodiment. FIG. 7 is a cross-sectional view of the zoom lens at a telephoto end in this embodiment. The zoom lens of this embodiment is a projection optical system that is designed mainly for an image projection apparatus (projector), and it includes a prism glass PR disposed closest to the reduction conjugate side (i.e., disposed closest to the image plane IP).

Figure 8:
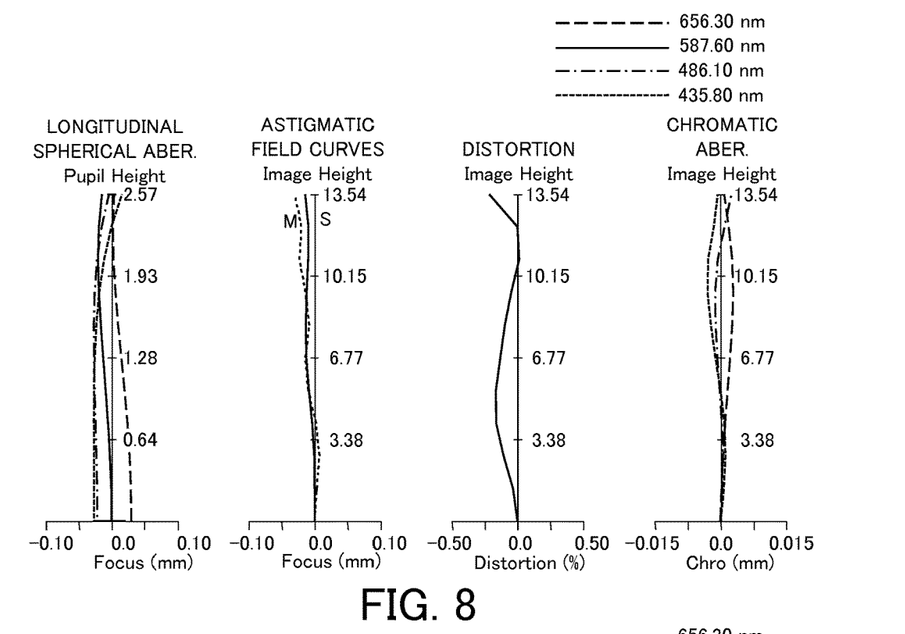
FIG. 8 is an aberration diagram of the optical system at the wide-angle end in Embodiment 2.
Figure 9:
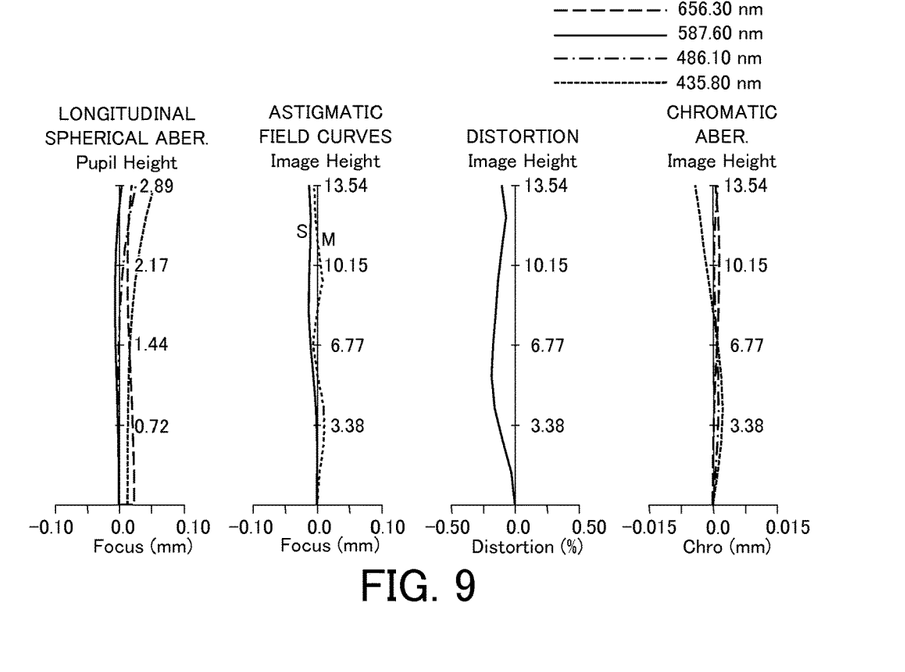
FIG. 9 is an aberration diagram of the optical system at a middle position in Embodiment 2.
Figure 10:
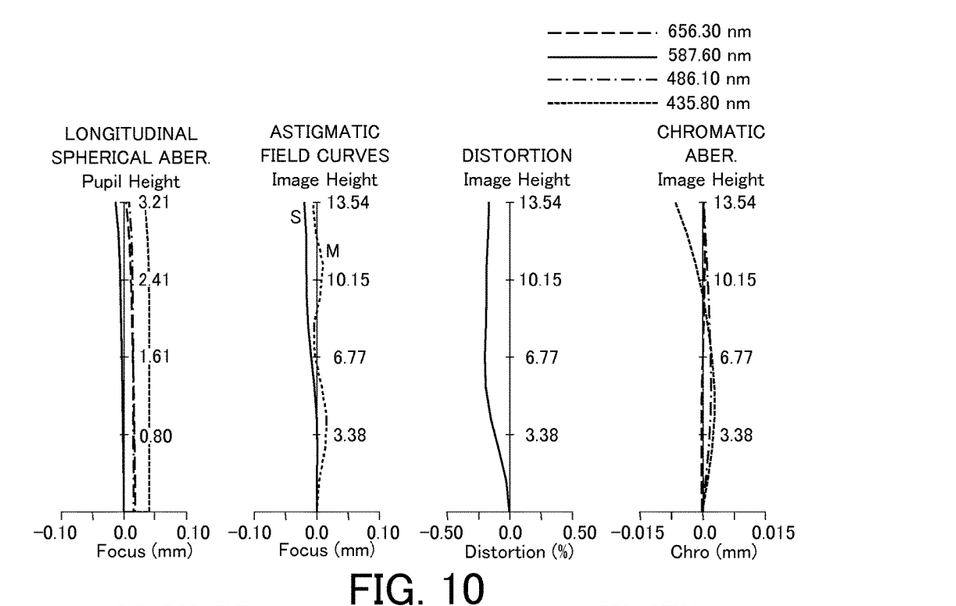
FIG. 10 is an aberration diagram of the optical system at the telephoto end in Embodiment 2.

FIG. 8 is an aberration diagram of the zoom lens at the wide-angle end, FIG. 9 is an aberration diagram of the zoom lens at the middle position, FIG. 10 is an aberration diagram of the zoom lens at the telephoto end, and each of which illustrates an imaging performance of the zoom lens where an object distance is 1225 mm. In the zoom lens of this embodiment, a satisfactory focusing performance is ensured by the effect described above and also the deterioration of the performance is small during the zooming.

Numerical example 2 of this embodiment is as follows.

Numerical Example 2 f = 13.35-16.69 ω = 45.18-38.90 FNO = 2.6 Φ = 27.08

| no | Φea | R | d | glass | Nd | νd |
|---|---|---|---|---|---|---|
| OBJ | | | 1225.00 | | | |
| 1* | 79.47 | 552.855 | 4.20 | SLAL7 | 1.65160 | 58.55 |
| 2 | 69.02 | 60.780 | 16.00 | | | |
| 3* | 51.27 | 87.058 | 2.60 | SLAH66 | 1.77250 | 49.60 |
| 4 | 40.90 | 27.825 | 14.82 | | | |
| 5 | 39.83 | −57.297 | 2.00 | SFPL51 | 1.49700 | 81.54 |
| 6 | 39.44 | 62.514 | 8.49 | | | |
| 7 | 39.87 | −108.109 | 2.00 | SLAM2 | 1.74399 | 44.79 |
| 8 | 41.35 | 316.339 | 4.51 | | | |
| 9 | 46.33 | 107.418 | 2.30 | EFDS1W | 1.92285 | 20.88 |
| 10 | 46.99 | 56.675 | 13.80 | SNBH8 | 1.72046 | 34.71 |
| 11 | 47.80 | −53.084 | (VARIABLE) | | | |
| 12 | 39.14 | 124.006 | 2.80 | SFSL5 | 1.48749 | 70.24 |
| 13 | 38.59 | 188.554 | (VARIABLE) | | | |
| 14 | 33.77 | 51.517 | 4.80 | STIM35 | 1.69894 | 30.13 |
| 15 | 32.88 | 734.287 | (VARIABLE) | | | |
| 16 | 17.70 | (STO) | (VARIABLE) | | | |
| 17 | 17.30 | 103.011 | 3.50 | SBSL7 | 1.51633 | 64.14 |
| 18 | 16.95 | −39.886 | 1.30 | TAFD25 | 1.90365 | 31.31 |
| 19 | 17.05 | −165.491 | (VARIABLE) | | | |
| 20 | 17.04 | −345.517 | 1.20 | TAFD25 | 1.90365 | 31.31 |
| 21 | 17.11 | 25.563 | 4.90 | SBSL7 | 1.51633 | 64.14 |
| 22 | 17.76 | −32.405 | (VARIABLE) | | | |
| 23 | 18.35 | −21.451 | 1.30 | TAFD25 | 1.90365 | 31.31 |

-continued

| f = 13.35-16.69 ω = 45.18-38.90 FNO = 2.6 Φ = 27.08 | | | | | | |
|---|---|---|---|---|---|---|
| 24 | 20.77 | 93.198 | 4.90 | SBSL7 | 1.51633 | 64.14 |
| 25 | 22.90 | -32.708 | 1.58 | | | |
| 26 | 27.30 | 305.020 | 7.00 | SFPL51 | 1.49700 | 81.54 |
| 27 | 28.89 | -26.301 | (VARIABLE) | | | |
| 28 | 35.08 | 93.749 | 5.00 | EFDS1W | 1.92285 | 20.88 |
| 29 | 35.08 | -175.752 | 3.00 | | | |
| 30 | 50.00 | ∞ | 28.00 | SBSL7 | 1.51633 | 64.14 |
| 31 | 50.00 | ∞ | 3.43 | | | |
| 32 | 50.00 | ∞ | 19.50 | SF6 | 1.80518 | 25.43 |
| 33 | 50.00 | ∞ | 6.08 | | | |
| IMG | | | | | | |

ASPHERICAL COEFFICIENT

| | sur | |
|---|---|---|
| | 1* | 3* |
| R | 5.5286E+02 | 8.7058E+01 |
| k | 0.0000E+00 | 0.0000E+00 |
| A | 5.0247E-06 | -6.2656E-06 |
| B | -3.1354E-09 | 4.9589E-09 |
| C | 2.2093E-12 | -3.3117E-12 |
| D | -8.7327E-16 | 2.0471E-15 |
| E | 1.7776E-19 | -6.0933E-19 |
| F | 0.0000E+00 | 0.0000E+00 |
| G | 0.0000E+00 | 0.0000E+00 |

ZOOMING SPACE

| sur | Wide-angle end | Middle position | Telephoto end |
|---|---|---|---|
| 11 | 51.201 | 28.463 | 13.778 |
| 13 | 1.189 | 14.536 | 19.804 |
| 15 | 21.825 | 27.726 | 33.171 |
| 16 | 7.134 | 3.826 | 1.418 |
| 19 | 2.385 | 2.328 | 2.000 |
| 22 | 3.121 | 3.401 | 2.820 |
| 27 | 4.147 | 10.722 | 18.011 |

Embodiment 3

Next, referring to FIGS. 11 to 15, a zoom lens (optical system) in Embodiment 3 of the present invention will be described. The zoom lens of this embodiment has a variable magnification ratio (zoom ratio) higher than that of the zoom lens of Embodiment 1, and thus the effect described above can be obtained even when the variable magnification ratio is changed.

Figure 11:
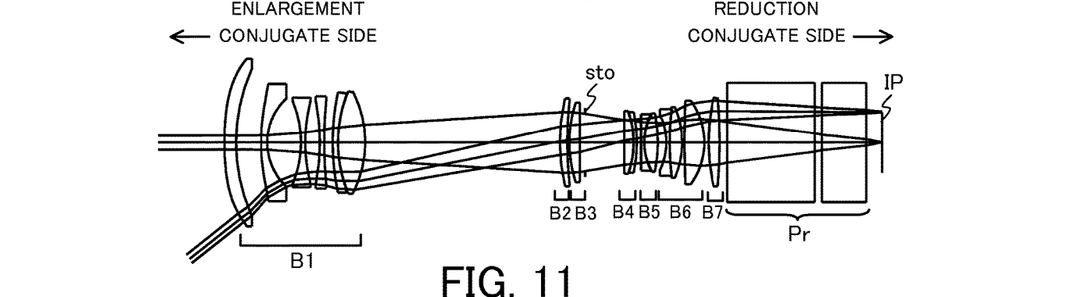
FIG. 11 is a cross-sectional view of an optical system at a wide-angle end in Embodiment 3.
Figure 12:
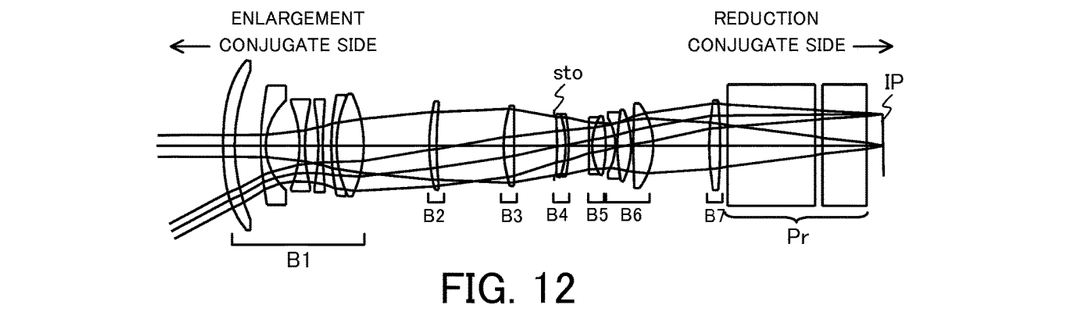
FIG. 12 is a cross-sectional view of the optical system at a telephoto end in Embodiment 3.

FIG. 11 is a cross-sectional view of the zoom lens at a wide-angle end in this embodiment. FIG. 12 is a cross-sectional view of the zoom lens at a telephoto end in this embodiment. The zoom lens of this embodiment is a projection optical system that is designed mainly for an image projection apparatus (projector), and it includes a prism glass PR disposed closest to the reduction conjugate side (i.e., disposed closest to the image plane IP).

Figure 13:
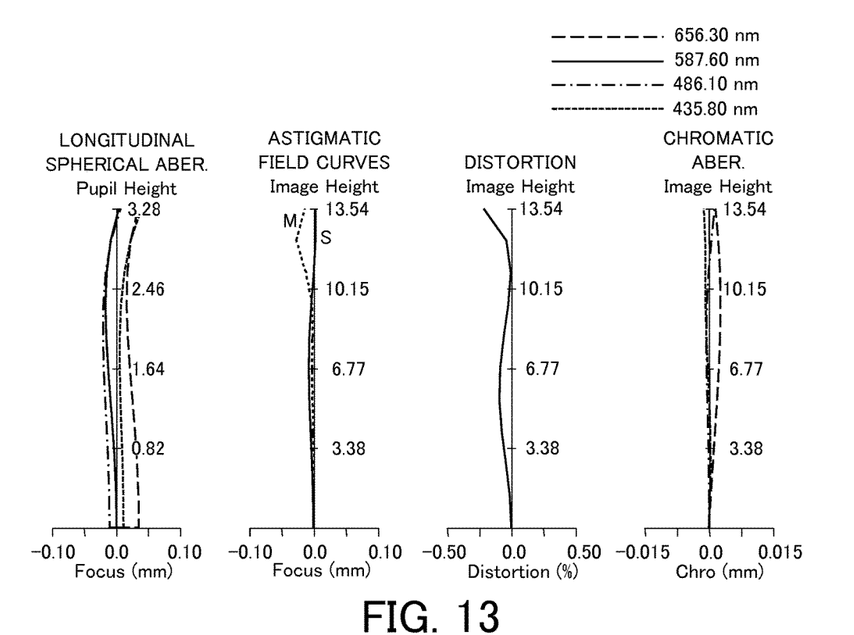
FIG. 13 is an aberration diagram of the optical system at the wide-angle end in Embodiment 3.
Figure 14:
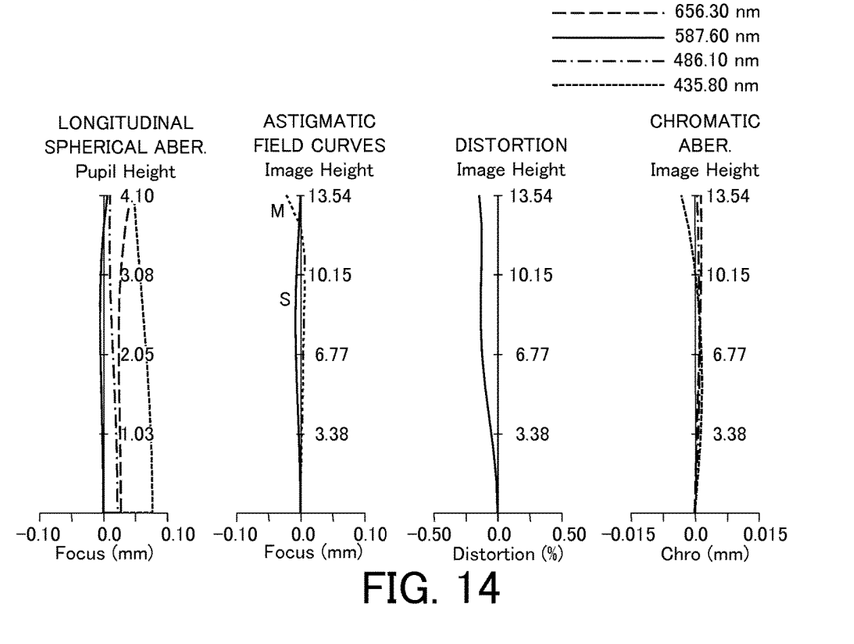
FIG. 14 is an aberration diagram of the optical system at a middle position in Embodiment 3.
Figure 15:
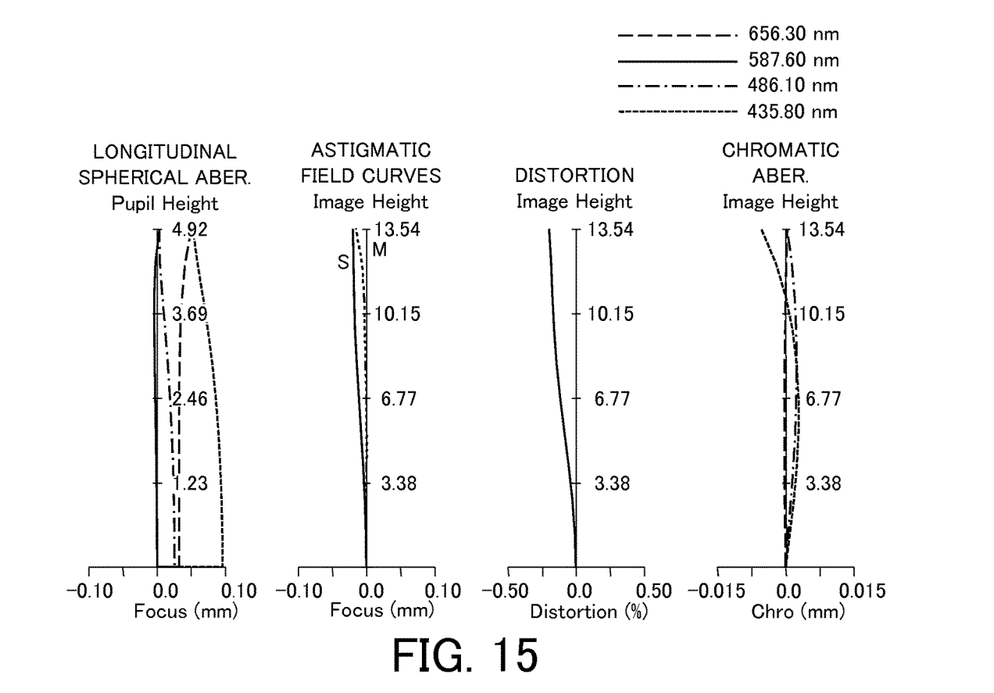
FIG. 15 is an aberration diagram of the optical system at the telephoto end in Embodiment 3.

FIG. 13 is an aberration diagram of the zoom lens at the wide-angle end, FIG. 14 is an aberration diagram of the zoom lens at the middle position, FIG. 15 is an aberration diagram of the zoom lens at the telephoto end, and each of which illustrates an imaging performance of the zoom lens where an object distance is 1534 mm. In the zoom lens of this embodiment, a satisfactory focusing performance is ensured by the effect described above and also the deterioration of the performance is small during the zooming.

Numerical example 3 of this embodiment is as follows.

Numerical Example 3

| f = 17.07-25.60 ω = 38.29-27.79 FNO = 2.6 Φ = 27.08 | | | | | | |
|---|---|---|---|---|---|---|
| no | Φea | R | d | glass | Nd | vd |
| OBJ | | | 1534.00 | | | |
| 1* | 70.44 | 140.037 | 5.20 | SLAL7 | 1.65160 | 58.55 |
| 2 | 65.17 | 81.317 | 11.37 | | | |
| 3* | 49.12 | 78.755 | 2.60 | SLAM3 | 1.71700 | 47.93 |
| 4 | 39.14 | 26.479 | 14.88 | | | |
| 5 | 37.58 | -49.105 | 2.00 | SFPL51 | 1.49700 | 81.54 |
| 6 | 36.77 | 68.511 | 6.26 | | | |
| 7 | 37.10 | -98.771 | 2.00 | SLAM2 | 1.74400 | 44.79 |
| 8 | 38.20 | 216.288 | 3.78 | | | |
| 9 | 40.93 | 106.384 | 2.30 | EFDS1W | 1.92286 | 20.88 |
| 10 | 41.34 | 55.801 | 12.00 | SNBH8 | 1.72047 | 34.71 |
| 11 | 42.18 | -50.180 | (VARIABLE) | | | |
| 12 | 36.00 | 77.044 | 3.27 | SBAL2 | 1.57099 | 50.80 |
| 13 | 35.67 | 148.870 | (VARIABLE) | | | |
| 14 | 32.71 | 58.136 | 4.69 | STIM35 | 1.69895 | 30.13 |
| 15 | 32.23 | -929.556 | (VARIABLE) | | | |
| 16 | 25.67 | (STO) | (VARIABLE) | | | |
| 1 | 25.35 | -509.441 | 4.18 | SBSL7 | 1.51633 | 64.14 |
| 18 | 24.93 | -37.430 | 1.30 | TAFD25 | 1.90366 | 31.31 |
| 19 | 25.05 | -62.536 | (VARIABLE) | | | |
| 20 | 23.02 | -272.289 | 1.20 | TAFD25 | 1.90366 | 31.31 |
| 21 | 22.94 | 26.043 | 6.12 | SBSL7 | 1.51633 | 64.14 |
| 22 | 23.55 | -55.473 | (VARIABLE) | | | |
| 23 | 23.95 | -25.512 | 1.30 | TAFD25 | 1.90366 | 31.31 |
| 24 | 27.01 | 103.959 | 5.79 | SBSL7 | 1.51633 | 64.14 |
| 25 | 28.91 | -39.92 | 1.00 | | | |
| 26 | 32.66 | 307.279 | 8.98 | SFPL51 | 1.49700 | 81.54 |
| 27 | 34.45 | -31.148 | (VARIABLE) | | | |
| 28 | 36.69 | 92.899 | 5.00 | SNPH1 | 1.80810 | 22.76 |
| 29 | 36.56 | -221.335 | 3.40 | | | |
| 30 | 50.00 | ∞ | 38.70 | SBSL7 | 1.51633 | 64.14 |
| 31 | 50.00 | ∞ | 3.43 | | | |
| 32 | 50.00 | ∞ | 19.50 | SF6 | 1.80518 | 25.43 |
| 33 | 50.00 | ∞ | 7.08 | | | |
| IMG | | | | | | |

ASPHERICAL COEFFICIENT

| | sur | |
|---|---|---|
| | 1* | 3* |
| R | 1.4004E+02 | 7.8755E+01 |
| k | 0.0000E+00 | 0.0000E+00 |
| A | 3.0130E-06 | -3.8775E-06 |
| B | -8.3465E-10 | 4.2422E-10 |
| C | 5.6258E-13 | 3.4767E-12 |
| D | -1.6591E-16 | -4.5355E-15 |
| E | 5.9818E-20 | 2.0993E-18 |
| F | 0.0000E+00 | 0.0000E+00 |
| G | 0.0000E+00 | 0.0000E+00 |

ZOOMING SPACE

| sur | Wide-angle end | Middle position | Telephoto end |
|---|---|---|---|
| 11 | 86.686 | 57.331 | 28.833 |
| 13 | 1.000 | 13.211 | 29.832 |
| 15 | 2.276 | 10.662 | 17.562 |
| 16 | 17.353 | 11.766 | 1.158 |
| 19 | 2.000 | 2.000 | 8.831 |
| 22 | 3.720 | 4.869 | 4.069 |
| 27 | 1.736 | 14.932 | 24.487 |

Table 1 indicates numerical values of each of the zoom lenses in Embodiments 1 to 3. Table 2 indicates conditional expressions (1) to (5) of each of the zoom lenses in Embodiments 1 to 3.

TABLE 1

| | EMBODIMENT | | |
|---|---|---|---|
| | 1 | 2 | 3 |
| FOCAL LENGTH fw AT WIDE-ANGLE END | 17.076 | 13.352 | 17.072 |
| FOCAL LENGTH ft AT TELEPHOTO END | 22.193 | 16.687 | 25.601 |
| FOCAL LENGTH f1 OF FIRST LENS UNIT | −54.353 | −44.742 | −52.068 |
| FOCAL LENGTH f2 OF SECOND LENS UNIT | 244.372 | 730.414 | 275.113 |
| FOCAL LENGTH f3 OF THIRD LENS UNIT | 99.121 | 78.489 | 78.434 |
| FOCAL LENGTH f4 OF FOURTH LENS UNIT | 176.694 | 1293.155 | 311.300 |
| FOCAL LENGTH f5 OF FIFTH LENS UNIT | −166.006 | −960.975 | −121.801 |
| FOCAL LENGTH f6 OF SIXTH LENS UNIT | −398.305 | −1814.405 | −1134.712 |
| FOCAL LENGTH f7 OF SEVENTH LENS UNIT | 78.896 | 66.182 | 81.555 |
| MOVING AMOUNT m1 OF FIRST LENS UNIT | 0.000 | 0.000 | 0.000 |
| MOVING AMOUNT m2 OF SECOND LENS UNIT | −35.081 | −37.422 | −57.854 |
| MOVING AMOUNT m3 OF THIRD LENS UNIT | −20.333 | −18.808 | −29.022 |
| MOVING AMOUNT msto OF STOP UNIT | −8.887 | −7.462 | −13.736 |
| MOVING AMOUNT m4 OF FOURTH LENS UNIT | −16.906 | −13.178 | −29.931 |
| MOVING AMOUNT m5 OF FIFTH LENS UNIT | −15.779 | −13.563 | −23.100 |
| MOVING AMOUNT m6 OF SIXTH LENS UNIT | −15.006 | −13.864 | −22.751 |
| MOVING AMOUNT m7 OF SEVENTH LENS UNIT | 0.000 | 0.000 | 0.000 |
| AIR CONVERSION LENGTH OF BACK FOCUS | 50.000 | 41.710 | 50.230 |

TABLE 2

| CONDITIONAL | EMBODIMENT | | |
|---|---|---|---|
| EXPRESSIONS | 1 | 2 | 3 |
| (1) | 3.183 | 3.351 | 3.050 |
| (2) | 0.342 | 0.320 | 0.340 |
| (3) | 1.071 | 0.972 | 1.296 |
| (4) | 1.052 | 0.978 | 1.015 |
| (5) | 0.830 | 0.873 | 0.800 |

Figure 16:
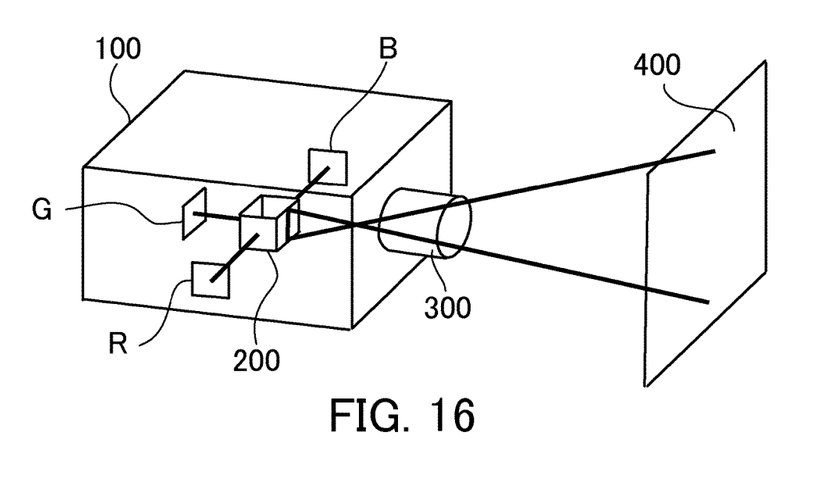
FIG. 16 is a schematic diagram of an image projection apparatus in each embodiment.

Next, referring to FIG. 16, an image projection apparatus including the imaging optical system (zoom lens) in each embodiment will be described. FIG. 16 is a schematic diagram of an image projection apparatus (projector 100) in this embodiment. FIG. 16 illustrates an example in which the imaging optical system of each embodiment is applied to a three-plate type color liquid crystal projector. The projector 100 synthesizes, through a color synthesis unit, image information of a plurality of color lights based on a plurality of liquid crystal display elements (image display elements) which form an original image, and enlarges and projects the synthesized image on a screen by using a projection lens.

In FIG. 16, the projector 100 (color liquid crystal projector) includes three panels (image display elements) of R (red), G (green), and B (blue). Furthermore, the projector 100 includes a prism 200 as the color synthesis unit that synthesizes each of the color lights from the panels of R, G, and B. The prism 200 synthesizes three optical paths to be a single optical path, and the projector 100 projects the synthesized image on a screen 400 by using a projection lens 300 including the imaging optical system (zoom lens) described above. Thus, by applying the imaging optical system of each embodiment to the projector or the like, an image projection apparatus having a high optical performance can be achieved.

According to each embodiment, a zoom lens and an image projection apparatus can be provided which are capable of forming a high-definition image in which various aberrations are appropriately corrected over a range from a wide angle-end to a telephoto end.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-234447, filed on Nov. 19, 2014, which is hereby incorporated by reference herein in its entirety.

What is claimed is:

1. A zoom lens comprising:
in order from an enlargement conjugate side to a reduction conjugate side,
   a first lens unit having a negative refractive power;
   a second lens unit having a positive refractive power;
   a third lens unit having a positive refractive power;
   a fourth lens unit having a positive refractive power;
   a fifth lens unit having a negative refractive power;
   a sixth lens unit having a negative refractive power; and
   a seventh lens unit having a positive refractive power,
wherein when zooming from a wide-angle end to a telephoto end, the second lens unit, the third lens unit, the fourth lens unit, the fifth lens unit, and the sixth lens unit are configured to move from the reduction conjugate side to the enlargement conjugate side while a space between lens units adjacent to each other changes, and
wherein a conditional expression below is satisfied:

$$2.3<|f1|/fw<4.0,$$

where fw is a focal length of the zoom lens at the wide-angle end and f1 is a focal length of the first lens unit.

2. The zoom lens according to claim 1, wherein the first lens unit and the seventh lens unit are configured not to move for zooming.

3. The zoom lens according to claim 1, wherein a conditional expression below is satisfied:

$$0.1<fw/bf<1.0,$$

where fw is a focal length of the zoom lens at the wide-angle end and bf is an air conversion back focus from a lens surface closest to the reduction conjugate side in the zoom lens to an image plane.

4. The zoom lens according to claim 1, wherein a conditional expression below is satisfied:

$$0.8<m4/m5<1.5,$$

where m4 and m5 are respectively moving amounts of the fourth lens unit and the fifth lens unit when zooming.

5. The zoom lens according to claim 1, wherein a conditional expression is satisfied:

$$0.8<m5/m6<1.5,$$

where m5 and m6 are respectively moving amounts of the fifth lens unit and the sixth lens unit when zooming.

6. The zoom lens according to claim 1, wherein a conditional expression is satisfied:

$$0.1 < (D56W + D56T)/(2 \times D56M) < 1.0,$$

where D56W is a space between the fifth lens unit and the sixth lens unit at the wide-angle end, D56M is a space between the fifth lens unit and the sixth lens unit at a middle position, and D56T is a space between the fifth lens unit and the sixth lens unit at the telephoto end.

7. The zoom lens according to claim 1, wherein each of the second lens unit and the third lens unit consists of a single lens having a positive refractive power.

8. The zoom lens according to claim 1, wherein each of the fourth lens unit and the fifth lens unit consists of a lens having a positive refractive power and a lens having a negative refractive power.

9. The zoom lens according to claim 1, wherein the first lens unit includes at least a negative meniscus aspherical lens convex toward the enlargement conjugate side.

10. The zoom lens according to claim 1, wherein the sixth lens unit consists of, in order from the enlargement conjugate side to the reduction conjugate side, a lens having a negative refractive power, a lens having a positive refractive power, and a lens having a positive refractive power.

11. The zoom lens according to claim 1 further comprising:
a stop disposed between the third lens unit and the fourth lens unit.

12. The zoom lens according to claim 11, wherein when zooming, the stop is configured to move along a locus different from loci of the third lens unit and the fourth lens unit.

13. The zoom lens according to claim 11, wherein when zooming, the stop is configured to move so that a space between the stop and the third lens unit increases.

14. The zoom lens according to claim 11, wherein when zooming, the stop is configured to move so that a space between the stop and the fourth lens unit decreases.

15. An image projection apparatus comprising:
an image display element configured to form an original image; and
a zoom lens,
wherein the zoom lens includes, in order from an enlargement conjugate side to a reduction conjugate side, a first lens unit having a negative refractive power, a second lens unit having a positive refractive power, a third lens unit having a positive refractive power, a fourth lens unit having a positive refractive power, a fifth lens unit having a negative refractive power, a sixth lens unit having a negative refractive power, and a seventh lens unit having a positive refractive power,
wherein when zooming from a wide-angle end to a telephoto end, the second lens unit, the third lens unit, the fourth lens unit, the fifth lens unit, and the sixth lens unit are configured to move from the reduction conjugate side to the enlargement conjugate side while a space between lens units adjacent to each other changes,
wherein the zoom lens is configured to project the original image formed by the image display element, and
wherein a conditional expression below is satisfied:

$$2.3 < |f1|/fw < 4.0,$$

where fw is a focal length of the zoom lens at the wide-angle end and f1 is a focal length of the first lens unit.

16. The image projection apparatus according to claim 15 further comprising:
a stop disposed between the third lens unit and the fourth lens unit.

17. The image projection apparatus according to claim 16, wherein when zooming, the stop is configured to move along a locus different from loci of the third lens unit and the fourth lens unit.

18. The image projection apparatus according to claim 16, wherein when zooming, the stop is configured to move so that a space between the stop and the third lens unit increases.

19. The image projection apparatus according to claim 16, wherein when zooming, the stop is configured to move so that a space between the stop and the fourth lens unit decreases.

* * * * *